(12) United States Patent
Bricaud et al.

(10) Patent No.: US 9,650,907 B2
(45) Date of Patent: May 16, 2017

(54) LABYRINTH SEAL

(71) Applicant: ALSTOM Technology Ltd, Baden (CH)

(72) Inventors: Cyrille Bricaud, Rheinfelden (DE); Ulrich Robert Steiger, Baden-Dättwil (CH); Axel Heidecke, Wettingen (CH); Carlos Simon-Delgado, Baden (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 0 days.

(21) Appl. No.: 14/202,571

(22) Filed: Mar. 10, 2014

(65) Prior Publication Data

US 2014/0191476 A1 Jul. 10, 2014

Related U.S. Application Data

(63) Continuation of application No. PCT/EP2012/067871, filed on Sep. 12, 2012.

(30) Foreign Application Priority Data

Sep. 12, 2011 (DE) .................... 20 2011 105 609 U

(51) Int. Cl.
*F01D 11/02* (2006.01)
*F16J 15/44* (2006.01)
*F16J 15/447* (2006.01)

(52) U.S. Cl.
CPC ............ *F01D 11/02* (2013.01); *F01D 11/025* (2013.01); *F16J 15/445* (2013.01); *F16J 15/4472* (2013.01); *F05D 2300/50212* (2013.01)

(58) Field of Classification Search
USPC ...... 277/411, 412, 418, 719, 420; 415/174.5
See application file for complete search history.

(56) References Cited

U.S. PATENT DOCUMENTS 2,123,818 A * 7/1938 Wegmann .................... 277/419
4,046,388 A * 9/1977 Meyer ........................... 277/418
(Continued)

FOREIGN PATENT DOCUMENTS

DE 1 093 628 11/1960
JP S50-085752 7/1975
(Continued)

OTHER PUBLICATIONS

Japanese Notification of Reasons for Refusal (Office Action 1) dated Mar. 30, 2015 for JP Appln. No. 2014-530199.
(Continued)

*Primary Examiner* — Kristina Fulton
*Assistant Examiner* — Eugene G Byrd
(74) *Attorney, Agent, or Firm* — Buchanan Ingersoll & Rooney PC

(57) ABSTRACT

A labyrinth seal is provided for sealing the annular interspace between the rotor and the stator of a steam turbine or gas turbine. The labyrinth seal includes a multiplicity of sealing strips which are arranged in series in the axial direction and fastened on the stator and project into the interspace. The sealing strips interact, with sealing effect, with rotor-side sealing elements which are arranged in a staggered manner. An improved sealing effect is achieved by the sealing strips in the cold installed state being offset in relation to a symmetrical position, wherein the offset has the reverse direction and the same amount as the distance by which the sealing strip is displaced relative to adjacent rotor-side sealing elements as a result of thermal expansions of the stationary and rotating components and support structure when being heated from the cold installed state to a hot steady-state operating condition.

4 Claims, 2 Drawing Sheets

(56) References Cited

U.S. PATENT DOCUMENTS

| | | | | |
|---|---|---|---|---|
| 4,351,532 A * | 9/1982 | Laverty | | 277/419 |
| 5,029,876 A * | 7/1991 | Orlando et al. | | 277/419 |
| 5,639,095 A * | 6/1997 | Rhode | | 277/303 |
| 5,704,614 A * | 1/1998 | Sanders et al. | | 277/303 |
| 5,735,667 A * | 4/1998 | Sanders et al. | | 415/170.1 |
| 5,961,279 A * | 10/1999 | Ingistov | | 415/170.1 |
| 5,971,400 A * | 10/1999 | Turnquist et al. | | 277/416 |
| 6,139,019 A * | 10/2000 | Dinc et al. | | 277/355 |
| 6,164,655 A * | 12/2000 | Bothien et al. | | 277/303 |
| 6,189,892 B1 * | 2/2001 | Uematsu et al. | | 277/418 |
| 6,394,459 B1 * | 5/2002 | Florin | | 277/303 |
| 6,761,530 B1 * | 7/2004 | Ginessin et al. | | 415/173.7 |
| 6,834,860 B2 * | 12/2004 | Rinaldo | | 277/418 |
| 6,962,342 B2 * | 11/2005 | Wieghardt | | 277/415 |
| 7,052,017 B2 * | 5/2006 | Uchida et al. | | 277/420 |
| 7,445,213 B1 * | 11/2008 | Pelfrey | | 277/418 |
| 7,628,581 B2 * | 12/2009 | De Simone et al. | | 415/173.5 |
| 7,731,478 B2 * | 6/2010 | Chevrette et al. | | 415/173.5 |
| 8,181,967 B2 * | 5/2012 | Feeny | | 277/412 |
| 8,434,766 B2 * | 5/2013 | Zeng et al. | | 277/419 |
| 8,540,479 B2 * | 9/2013 | Awtar et al. | | 415/113 |
| 2004/0096319 A1 * | 5/2004 | Uchida et al. | | 415/174.5 |
| 2004/0100035 A1 * | 5/2004 | Turnquist et al. | | 277/412 |
| 2007/0132192 A1 * | 6/2007 | Chevrette | | 277/412 |
| 2011/0068540 A1 * | 3/2011 | Colson et al. | | 277/419 |
| 2011/0272893 A1 * | 11/2011 | Raible | | 277/419 |
| 2012/0043728 A1 * | 2/2012 | Zeng et al. | | 277/412 |
| 2012/0091662 A1 * | 4/2012 | Neeli et al. | | 277/420 |

FOREIGN PATENT DOCUMENTS

| | | |
|---|---|---|
| JP | H07-243303 | 9/1995 |
| JP | 2002-357103 | 12/2002 |
| JP | 2003-254006 | 9/2003 |
| JP | 2006-052808 | 2/2006 |
| JP | 2008-223660 | 9/2008 |
| RU | 2244182 C1 | 1/2005 |
| SU | 1574914 A1 | 6/1990 |
| WO | 2006/111405 | 10/2006 |

OTHER PUBLICATIONS

Decision of Grant issued from Russian Patent Office dated Jun. 10, 2015 for RU Application No. 2014114501.

* cited by examiner

LABYRINTH SEAL

CROSS-REFERENCE TO RELATED APPLICATIONS

This application claims priority to PCT/EP2012/067871 filed Sep. 12, 2012, which in turn claims priority to German application 202011105609.4 filed Sep. 12, 2011, the contents of which are both incorporated in their entireties.

TECHNICAL FIELD

The present invention relates to the field of rotating thermal machines. It refers to a labyrinth seal for sealing the annular interspace between a stationary and a rotating part of a rotating thermal machine, especially of a steam turbine or gas turbine.

BACKGROUND

A typical known interengaging labyrinth seal system is reproduced in detail in a greatly simplified form in FIG. 1. The labyrinth seal 24 which is shown there seals the annular interspace 11 between the (inner) rotating part 12 and the static part 10, which concentrically encompasses it, against throughflow of gas. The interengaging labyrinth seal 24 comprises both stator-side sealing strips 13 which are fastened on the static part 10 and rotor-side sealing strips 14 which are fastened on the rotating part 12, which sealing strips are arranged in a staggered manner and engage radially in the interspaces of the opposite sealing strips in each case.

An interengaging labyrinth seal according to FIG. 1, however, brings a problem along with it:

The large thermally induced displacements of rotor and stator lead to large differences in the clearance of the labyrinth seal system so that the sealing strips migrate from their central position of the installed state and during steady-state conditions do not return, or only partially return, to this position. Since the sealing effect of a labyrinth seal in the resulting displaced position can be negatively affected, the leakage losses become greater and the steady-state power and the efficiency of the machine can be negatively influenced.

Different configurations of interengaging labyrinth seals, in which the rotor is additionally divided into sections with stepped diameter, are known from U.S. Pat. No. 5,029,876, for example.

SUMMARY

A labyrinth seal for sealing the annular interspace between a stationary part and a rotating part of a steam turbine or gas turbine comprises a multiplicity of sealing strips which are arranged in series in the axial direction, are fastened on the stationary part and project into the interspace, which sealing strips interact, with sealing effect, with rotor-side sealing elements which are arranged in a staggered manner.

It is the object of the invention to create a labyrinth seal which avoids the disadvantages of the known labyrinth seals and is especially distinguished by the best leak-tightness being achieved during steady-state operation.

The object is achieved by means of the total features of claim 1.

One aspect of the invention entails designing the labyrinth seal in a similarly interengaging manner, as is the case with the conventional double-sided labyrinth seals, but with the sealing strips in the cold installed state being offset in relation to a symmetrical position. The offset has the reverse direction and the same amount as the distance by which the sealing strips are displaced relative to adjacent rotor-side sealing elements as a result of thermal expansions of the stationary support structure and rotating components when being heated from the cold installed state to a hot, steady operating state.

The offset is therefore selected so that the sealing strips during steady-state operation migrate into the symmetrical position, i.e. the distance from one sealing strip to the two adjacent rotor-side sealing elements in each case becomes the same.

In one embodiment, the labyrinth seal is designed in a similarly interengaging manner, as is the case with the conventional double-sided labyrinth seals. However, instead of the rotor-side separate sealing strips which are inserted into the rotor, sealing elements which are formed or formed out directly on the rotating part are now used. The structured circumferential surface of the rotating part is therefore not only a carrier but itself forms a part of the sealing system.

In the unsymmetrical cold installed position, the distance from the rotor-side sealing element to the nearer sealing strip is 0.5 times the distance to the farther sealing strip.

In one embodiment, in the cold installed state the distance from the rotor-side sealing element to the nearer sealing strip is between 0.2 and 0.8 times the distance to the farther sealing strip. In a further embodiment, in the cold installed state the distance from the rotor-side sealing element to the nearer sealing strip is preferably between 0.3 and 0.6 times the distance to the farther sealing strip.

Another embodiment of the labyrinth seal according to the invention is characterized in that the formed projections, between two adjacent rotor-side sealing elements in each case, have an essentially rectangular cross section and extend in the radial direction into the interspace.

Further advantageous characteristics of the seal result if according to a development of the invention the rotating part has an intermediate contour with varying diameter in the axial direction between adjacent formed projections, and if the variation of the outside diameter in the intermediate contour is designed in such a way that during interaction with the respective sealing strip of the stationary part a compensation of thermally induced displacements between rotor and stator is provided. The effect achieved as a result of this is that a passive control of the clearance is enabled directly as a result of the shape of the rotating part.

In this case it is especially conceivable that the intermediate contour, in the region of the associated sealing strip, has a conical section which during an axial relative movement between rotor and stator alters the clearance in the seal.

It is also conceivable, however, that the intermediate contour has a diameter step in the region of the associated sealing strip.

According to one embodiment, the intermediate contour of the formed projections has in each case a maximum height in the middle between two adjacent rotor-side sealing elements so that during steady-state operation the sealing strips lie opposite a region with maximum height in each case and the free gap between sealing strips and intermediate contour becomes minimal.

Rotating parts of the labyrinth seal are, for example, the rotor itself, rotor blades or heat shields of the rotor. The rotor, in the region of the shaft cover, i.e. the region between compressor and turbine, is typically constructed with a labyrinth seal which controls a direct leakage of compressor exit air to the turbine. Blades and heat shields are provided with labyrinth seals in order to reduce secondary flows. In particular, shrouds of blades are frequently provided with sealing elements (sealing strips, labyrinth seals, ribs or bridges) which in the installed state, together with adjacent parts, create an encompassing labyrinth seal.

BRIEF DESCRIPTION OF THE DRAWINGS

The invention shall subsequently be explained in more detail based on exemplary embodiments in conjunction with the drawing. In the drawing

DETAILED DESCRIPTION

Figure 1:
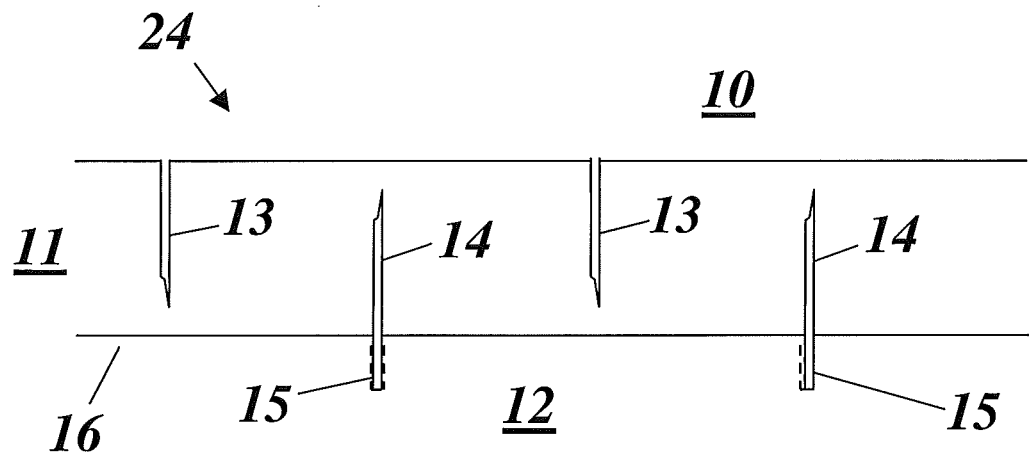
FIG. 1 shows in a simplified view in a detail a two-sided interengaging labyrinth seal with stator-side and rotor-side inserted sealing strips.
Figure 2:
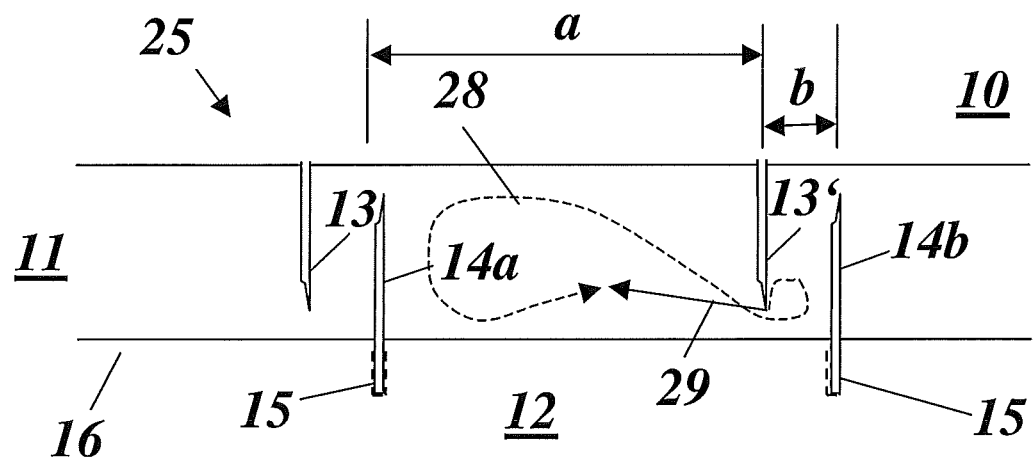
FIG. 2 shows in a view comparable to FIG. 1 a first exemplary embodiment of a labyrinth seal according to the invention with an asymmetric position of the sealing strips.

FIG. 2 shows in a view comparable to FIG. 1 a first exemplary embodiment of a labyrinth seal according to the invention. In contrast to the seal according to FIG. 1, in which the sealing strips 13 of the stator side are arranged in each case symmetrically in the middle between two sealing strips of the rotor side, the sealing strips 13 of the stator side are arranged asymmetrically in each case. The distance b from the sealing strip 13' of the stator side to the next adjacent sealing strip 14b of the rotor side on the right is a fraction (ratio b to a is less than 1) of the distance a from the sealing strip 13' of the stator side to the next adjacent sealing strip 14a of the rotor side on the left. FIG. 2 shows the cold installed state of the labyrinth seal 25. Also shown is the transient movement 28 of the seal tips of a sealing strip 13 of the stator side relative to the rotating part 12. The overall movement from the cold state to the steady state is shown. The resulting shift from cold to hot conditions 29 is also shown.

Figure 3:
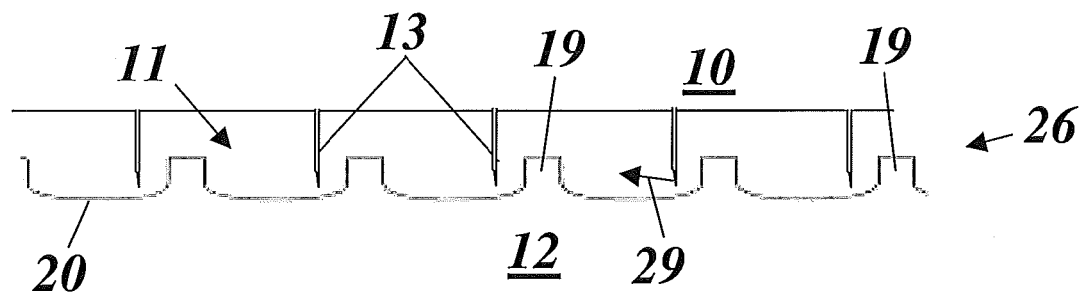
FIG. 3 shows in a view comparable to FIG. 2 a second exemplary embodiment of a labyrinth seal according to the invention with rotor-side formed projections instead of sealing strips.

FIG. 3 shows in a view comparable to FIG. 2 an exemplary embodiment of a labyrinth seal, which comprises rotor-side formed projections 19 which, in the manner of sealing strips, interact with the stator-side sealing strips 13 in an interengaging manner. The formed projections 19 are the same in relation to each other and have the same axial spacing in relation to each other. The formed projections have an essentially rectangular cross section and extend in the radial direction into the interspace 11 between rotating part 12 and static part 10. The (axial) thickness of the formed projections 19 is noticeably greater than the thickness of the sealing strips 13. The formed projections 19 lie between adjacent sealing strips 13 in a manner in which they are displaced from the middle by the negative offset 29. The transitions between the formed projections 19 and the intermediate contours 21 in between are rounded in order to minimize notch effects. The intermediate contours 21 are of a slightly concave design and have their lowest point in the middle of the intermediate contour 21. As a result of the slight contouring of the intermediate contours 21, a comparatively small change of the clearance in the resulting labyrinth seal 27 ensues if rotating part 12 and static part 10 move relatively to each other in the axial direction. Also shown is the resulting shift 29 from cold to hot conditions which makes it clear that the sealing strips 13 come to lie in the middle between the formed projections 19 during steady-state operation.

Figure 4:
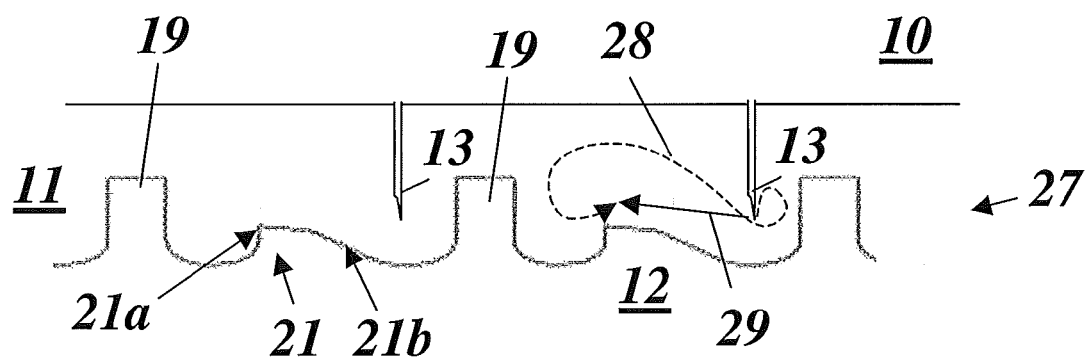
FIG. 4 shows in a view comparable to FIG. 3 a third exemplary embodiment of a labyrinth seal according to the invention with intermediate contours of the rotor—comprising a diameter step and a conical section—which are arranged between the rotor-side formed projections.

This situation is different in the case of the exemplary embodiment of FIG. 4. FIG. 4 shows in a view comparable to FIG. 3 a further exemplary embodiment of a labyrinth seal according to the invention with intermediate contours 21—arranged between the rotor-side formed projections 19—of the rotor-side part 12 which are appreciably more pronounced in their structuring and comprise both a sharp diameter step 21a and a conical section 21b which are separated from each other by means of a diameter plateau. As a result of this, specific changes in the clearance of the labyrinth seal 27 can be achieved in the event of thermal expansion. In particular, the sealing strips 13, during steady-state operation, thus come to lie opposite the intermediate contour 21 after being displaced 29 by the resulting shift from cold to hot conditions, so that losses are minimized.

Overall, using the invention a labyrinth seal for gas turbines or steam turbines is created, which labyrinth seal has improved leak-tightness during steady-state operation and which in a simple way enables passive controlling of the clearance.

The invention claimed is:

1. A labyrinth seal for sealing an annular interspace between a stationary part and a rotating part of a steam turbine or gas turbine,
comprising: a multiplicity of sealing strips which are arranged in series in an axial direction, are fastened on the stationary part and project into the interspace, which sealing strips interact, with sealing effect, with rotor-side sealing elements which are arranged in a staggered manner, wherein the sealing strips in a cold installed state are offset in relation to a symmetrical position, wherein the offset has a reverse direction in a same amount as a distance by which the sealing strip is displaced relative to adjacent rotor-side sealing elements as a result of thermal expansions of a stationary support structure and rotating components when being heated from a cold installed state to a hot steady-state operating condition, and wherein during the hot steady-state operating condition the sealing strips are in a symmetrical position, with an equal distance from one sealing strip to each adjacent rotor-side sealing element; wherein the rotor-side sealing elements are formed as annular formed projections of the rotating part; an wherein an intermediate contour is arranged between the annular formed projections, the intermediate contour comprising a and rotating components when being heated from a cold installed state to a hot steady state operating condition, and wherein during the hot steady-state operating condition the sealing strips are in a symmetrical position, with an equal distance from one sealing strip to each adjacent rotor-side sealing element; wherein the rotor-side sealing elements are formed as annular formed projections of the rotating part; and wherein an intermediate contour is arranged between the annular formed projections, the intermediate contour comprising 90 degree step and a conical contour on each side of the 90 degree step and wherein the intermediate contours are separated from each other by a diameter plateau, and wherein the interspace between each of the annular formed projections is configured to receive a single sealing strip, which during steady-state operation comes to lie opposite the intermediate contour after being displaced by a resulting shift from cold to hot conditions.

2. The labyrinth seal of claim 1, wherein the cold installed state the
distance (b) from the rotor-side sealing elements to the nearest sealing strip of the stationary part is between 0.2 and 0.8 times the distance (a) to the farther sealing strip.

3. The labyrinth seal of claim 1, wherein the formed projections, between two adjacent rotor-side sealing elements in each case, have a rectangular cross section and extend in the radial direction into the interspace.

4. The labyrinth seal of claim 1, wherein transitions between the annular formed projections and the intermediate contour are rounded.

* * * * *